(12) United States Patent
Eickhoff

(10) Patent No.: US 7,240,675 B2
(45) Date of Patent: Jul. 10, 2007

(54) PARABOLIC TROUGH COLLECTOR

(75) Inventor: Martin Eickhoff, Pechina (ES)

(73) Assignee: Schott AG, Mainz (DE)

( * ) Notice: Subject to any disclaimer, the term of this patent is extended or adjusted under 35 U.S.C. 154(b) by 185 days.

(21) Appl. No.: 10/978,300

(22) Filed: Nov. 1, 2004

(65) Prior Publication Data

US 2005/0139210 A1 Jun. 30, 2005

(30) Foreign Application Priority Data

Nov. 4, 2003 (DE) ................ 103 51 474

(51) Int. Cl.
*F24J 2/24* (2006.01)
*F24J 3/02* (2006.01)
*F16L 27/12* (2006.01)

(52) U.S. Cl. .............. 126/652; 126/653; 126/654; 126/655; 126/657; 126/694

(58) Field of Classification Search ........ 126/652–657, 126/692–696; 285/45, 911
See application file for complete search history.

(56) References Cited

U.S. PATENT DOCUMENTS

| | | | | | |
|---|---|---|---|---|---|
| 1,081,963 | A | * | 12/1913 | Holloway ................. | 285/45 |
| 1,184,216 | A | * | 5/1916 | Smith ..................... | 285/63 |
| 2,133,649 | A | * | 10/1938 | Abbot .................... | 126/608 |
| 3,333,871 | A | * | 8/1967 | Abbiati et al. ............ | 285/45 |
| 3,837,685 | A | * | 9/1974 | Miller .................... | 285/45 |
| 3,916,871 | A | * | 11/1975 | Estes et al. ............... | 126/666 |
| 4,133,298 | A | * | 1/1979 | Hayama .................. | 126/591 |
| 4,173,968 | A | * | 11/1979 | Steward .................. | 126/654 |
| 4,186,725 | A | * | 2/1980 | Schwartz ................. | 126/694 |
| 4,202,322 | A | * | 5/1980 | Delgado et al. ........... | 126/574 |
| 4,231,353 | A | * | 11/1980 | Kanatani et al. .......... | 126/652 |
| 4,279,242 | A | * | 7/1981 | Bogatzki ................. | 126/655 |
| 4,283,078 | A | * | 8/1981 | Ross et al. ................ | 285/45 |
| 4,304,222 | A | * | 12/1981 | Novinger ................. | 126/655 |
| 4,337,758 | A | * | 7/1982 | Meinel et al. ............. | 126/684 |
| 4,350,372 | A | * | 9/1982 | Logsdon ................. | 285/45 |
| 5,555,878 | A | * | 9/1996 | Sparkman ............... | 126/657 |
| 6,705,311 | B1 | * | 3/2004 | Schwartzman et al. ..... | 126/657 |
| 7,013,887 | B2 | * | 3/2006 | Kuckelkorn et al. ........ | 126/652 |

FOREIGN PATENT DOCUMENTS

JP 56-40050 * 4/1981
JP 56-155333 * 12/1981

* cited by examiner

*Primary Examiner*—Carl D. Price
(74) *Attorney, Agent, or Firm*—Michael J. Striker

(57) ABSTRACT

The parabolic trough collector has a receiver formed by several single absorber tubes (13). The single absorber tubes (13) are supported by absorber tube supports (14) and surrounded by a glass tube (15). Because of different expansion behavior of the absorber tube (13) and the glass tube (15) during collector operation flexible unions (17) are foreseen between absorber tube (13) and glass tube (15). In order to use the radiation coming to the non active-area where the absorber tube supports (14) and the flexible unions (17) are installed a mirror collar (20) is installed on this area. The mirror collar (20) is able to reflect the solar radiation, which is coming from different directions, to the active absorber part of the single absorber tubes (13) also when the sun incident angle is changing.

8 Claims, 3 Drawing Sheets

PARABOLIC TROUGH COLLECTOR

CROSS-REFERENCE TO RELATED APPLICATIONS

This application claims foreign priority of the German patent with the German patent number 103 51 474.0-15

STATEMENT REGARDING FEDERALLY SPONSORED RESEARCH OR DEVELOPMENT

D.L.R. (Deutsches Zentrum für Luft-und Raumfahrt), a German federally sponsored Research Organization has declared the invention as "free" for the inventor in case of patent applications in all countries except Germany and Spain.

REFERENCE TO SEQUENCE LISTING, A TABLE, OR A COMPUTER PROGRAM LISTING COMPACT DISK APPENDIX

Not applicable

BACKGROUND OF THE INVENTION

The invention is related to a parabolic trough collector. The collector has a receiver formed by single absorber tubes that are installed on absorber tube supports and a parabolic reflector that reflects the solar radiation onto the receiver. The single absorber tubes of the receiver are surrounded by glass tubes. Special flexible unions are foreseen to compensate the heat expansion between the steal of the single absorber tubes and the glass tubes.

Commercial parabolic trough collectors for high temperature show high optical losses in the flexible unions between glass and absorber tubes. In those areas, where the absorber tube supports are supporting the receiver, the glass tube is interrupted and the flexible unions are installed. Therefore, the absorption of the concentrated solar radiation by an active absorber tube surface is not possible in those areas.

The one axis tracking parabolic trough collectors concentrate the solar radiation on a focus line where the receiver is situated. The heat transfer fluid, usually thermal oil or water, flows through the receiver. A big part of the solar radiation is converted by the receiver into thermal heat and is transferred to the heat transfer fluid. In order to avoid high thermal losses the single absorber tubes are surrounded by glass tubes. The space between absorber tube and glass tube is evacuated. Because of static reasons the absorber receiver consists on several single absorber tubes that are welded together in one line and in the welding area metal supports are installed that fix the single absorber tubes in the focus line of the parabolic trough collector. In operation conditions, the irradiated single absorber tubes become hot and expand more than the colder glass tubes. Therefore, in commercial parabolic trough collectors flexible unions are foreseen between absorber tubes and glass tubes. Normally, metal bellows are used to compensate the different expansions of the single absorber tubes and the glass tubes. The flexible unions are protected by aluminum sheets against the concentrated solar radiation that would produce dangerous high temperature gradients in the glass—metal welding area.

Commercial solar parabolic trough collectors for high temperature have high optical losses in the flexible union area. Because of the necessity of flexible bellows and the space for the absorber tube supports those areas cannot be used as active absorber area. About 4-6% of the reflected radiation is concentrated onto those non-active areas and lost for the system. The use of the concentrated radiation onto those non-active areas seems very complicated because of the continuously changing sun incident angle.

BRIEF SUMMARY OF THE INVENTION

The present invention has the intention to create a parabolic trough collector with more efficient optical behavior in the non-active areas.

Around the non-active areas of the parabolic trough collector, where the bellows and the supports are installed, a covering mirror collar with a conic form is installed. The conic form covers the circumference of the non-active area totally or partly.

The mirror collar works as a secondary reflector that reflects the concentrate solar radiation from the non-active absorber part to the active absorber part. The totally o partly covering mirror collar is able to reflect the solar radiation coming from different directions to the active absorber part also when the sun incident angle is changing.

The conic form of the mirror collar means that the diameter of the mirror collar is coming smaller in direction to the active absorber area.

That tapering can be conical or can differ from the conical form. That may be a concave o convex form.

It is not necessary to cover the circumference of the whole non-active area. Actually, a covering of the non-active area where the concentrated solar radiation is coming is sufficient. From there the mirror collar reflect the concentrated solar radiation through the adjoining glass tube onto the absorber tube.

The mirror collar can be formed by two joined conic mirror surfaces orientated in opposite directions. In this case the concentrated solar radiation coming to the non-active area can be reflected to the left and the right active area next to the mirror collar. The two conic surfaces can have different taper angle. The taper angle indicates the slope of the mirror surface referring to the absorber axis.

BRIEF DESCRIPTION OF THE SEVERAL VIEWS OF THE DRAWING

In the following section the invention and examples of the possible invention design are explained by using figures. The description of special design examples does not limit the protection of other design possibilities of this invention.

The figures shows.

DETAILED DESCRIPTION OF THE INVENTION

Figure 1:
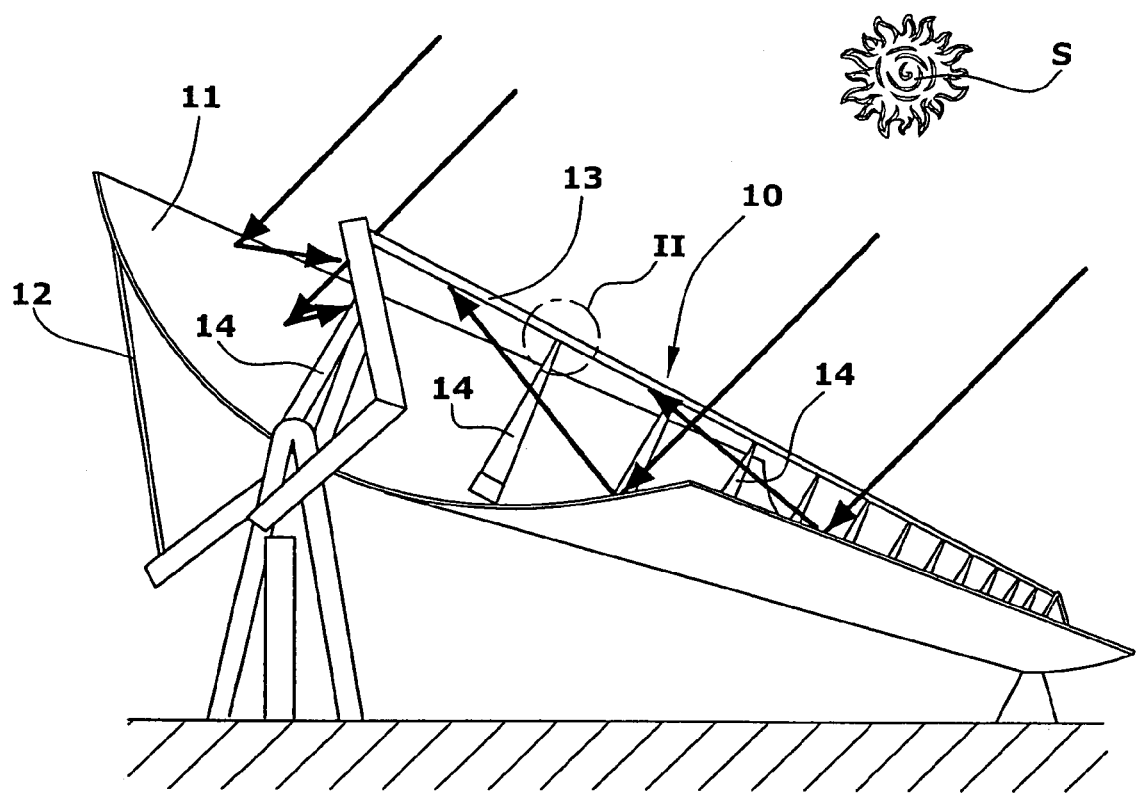
FIG. 1 a perspective representation of a parabolic trough collector

A parabolic trough collector (10) with a parabolic reflector (11) is represented in FIG. 1. El parabolic reflector (11) is installed on a reflector support (12). Along the focus line of the parabolic reflector (11) the receiver formed by single absorber tubes (13) is installed on absorber supports (14) that are fixed with the reflector structure. The reflector (11), the reflector support (12), the single absorber tubes (13) and the absorber supports (14) form a fixed unit that can be turned around the collector tracking axis in order to follow the sun S. The parallel incident radiation coming from the sun S is focused by the parabolic reflector (11) onto the absorber tubes (13). The heat transfer fluid, for example thermal oil or water, flows through the absorber tubes (13) and is heated up. In the collector outlet another collector can be connected in order to go ahead with the heating or the heat transfer fluid can be pumped to a power block in order to produce electrical energy or to use process heat.

Figure 2:
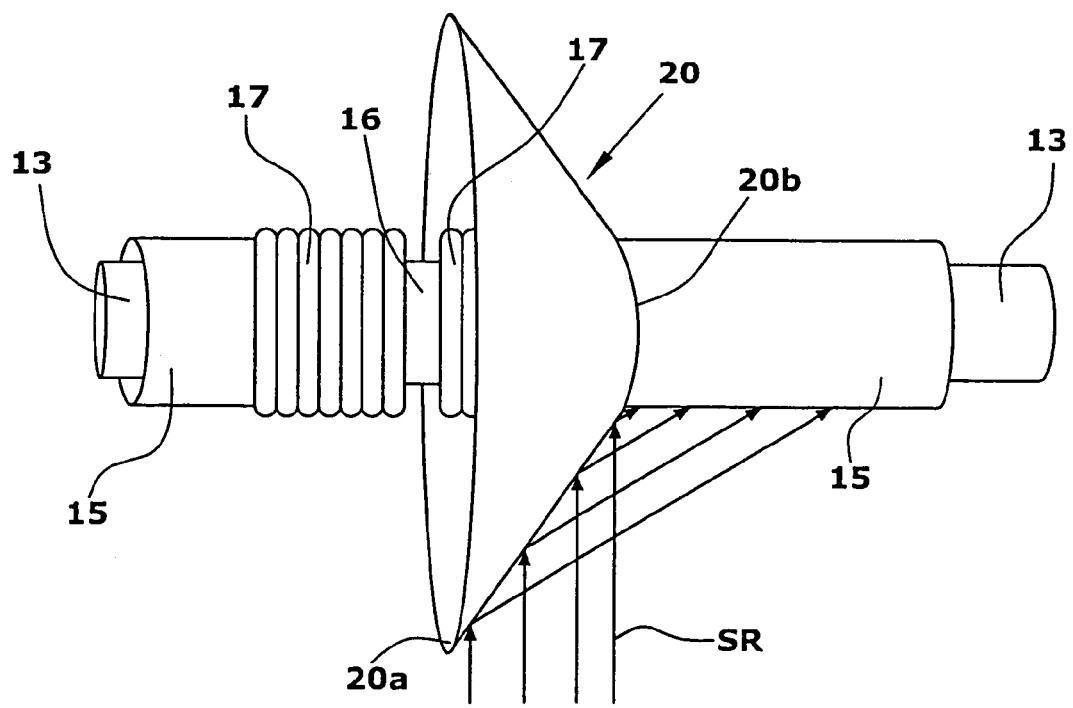
FIG. 2 a representation of detail II of FIG. 1 to describe the construction of a mirror collar that covers the non-active area of the absorber tubes FIG. 3 a mirror collar design that covers halve non active area FIG. 4 a mirror collar design formed by two joined conic mirror surfaces FIGS. 5, 6 and 7 different situations because of different sun incident angles to the mirror collar of FIG. 4

FIG. 2 shows the absorber tube surrounded by the glass tube (15). The glass tubes have the function to minimize heat losses due to convection o heat radiation. The space between absorber tube (13) and glass tube (15) is evacuated. Because of static reasons the receiver consists on single absorber tubes (13) that are welded together in one line and in the welding area (16) metal supports (14) are installed that hold the absorber tubes (13) in the focus line of the parabolic trough collector. The welding area (16) is not surrounded by a glass tube (15). In operation conditions, the irradiated absorber tubes (13) become hot and expand more than the colder glass tubes (15). Therefore, flexible unions (17) are foreseen between absorber tube (13) and glass tube (15). Normally, flexible metal bellows are used to compensate the different expansions of the absorber tubes (13) and the glass tubes (15).

As invented, the area between two glass tubes (15) is covered by a mirror collar (20), which has in this example a 360° covering cone form. The mirror surface is on the outer side. One cone end (20a) has a wider diameter and the other cone end (20b) a smaller diameter. The diameter of the cone end (20b) is identical with the diameter of the glass tube (15).

The mirror collar (20) covers by this way a part of the area between two glass tubes (15). In the presented example a bellow (17) is situated inside the space formed by the mirror collar (20). A second (not represented) mirror collar can be installed next to the first mirror collar (20) so that both bellows are surrounded by mirror collars. In this case both wide cone ends (20a) are stuck together.

The mirror collars reflect the concentrated solar radiation SR due to the conical mirror surface onto the limiting absorber tubes (13). It can be seen that the sun radiation SR coming to the non-active area where the bellows (17) are installed is reflected by the mirror collar (20) to the active absorber tube area by passing through the glass tube (15). By this way more thermal energy is absorbed and the efficiency of the parabolic trough collector becomes higher.

Figure 3:
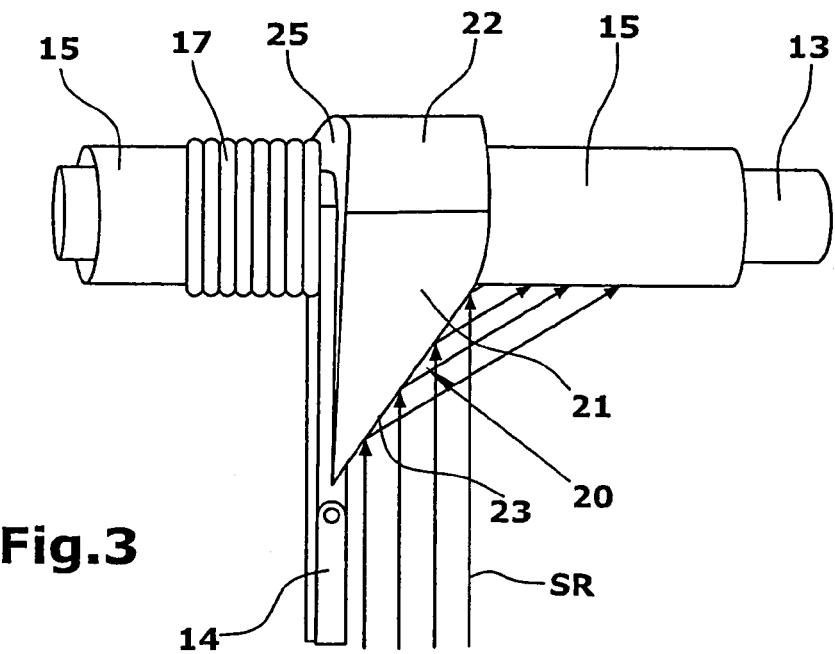

FIG. 3 shows a design example where the mirror collar (21) only covers the halve tube circumference. The other upper halve is covered by an aluminum shield (22). The mirror collar reflects the concentrated solar radiation SR due to the conical mirror surface (23) onto the limiting absorber tubes (13) by passing through the glass tube (15). In FIG. 3 the absorber tube support (14) that fixes the absorber tube is represented.

On both sides next to the absorber tube support (14) the flexible bellows (17) are situated. Only one bellow con be seen in FIG. 3; the other one is covered by the mirror collar (21) and the bellow shield (22). In a final application of this design example the not covered bellow would be also covered by a mirror collar (21) with a conic form in opposite direction. The space inside the mirror collar (21) and the aluminum shield (22) is filled by insulation material (25).

Actually, parabolic trough collectors are aligned in north south direction and tracked with one tracking axis from east to west. In that alignment the biggest annual energy output can be reached. During the whole year and during the day the sun incident angle changes. The sun incident angle values depend on the hour and on the location of the collector. For a north-south aligned collector the sun incident angle are coming from the south or from the north. FIG. 4-7 show the basic sun incident angle situations for a north-south aligned collector located in the south of USA.

The design example in FIG. 4-7 shows a double mirror collar (20) which is made by the first conic mirror (21) and the second conic mirror (24). Both conic mirrors are stuck together in that way that the wider diameter of both conic mirrors are together. The conic mirrors (21) and (24) are halve cones and cover only the halve circumference of the non-active connection area of the absorber tube (13). The other halve circumference is covered by a bellow shield (22). The double mirror collar together with the bellow shield (22) covers the whole connection area between two absorber tubes (13).

In the ideal case the collector concentrates al sun radiation to the focus line. That means that the sun radiation coming from different direction of the parabolic mirrors hits the absorber tube in a rotation symmetric way. This is also valid for different sun incident angles. The fact that the mirror collar is rotation symmetric or nearly rotation symmetric to the focus line, the sun rays shown in the FIG. 4-7 are representative for all other sun rays because of rotation symmetric reasons.

Figure 4:
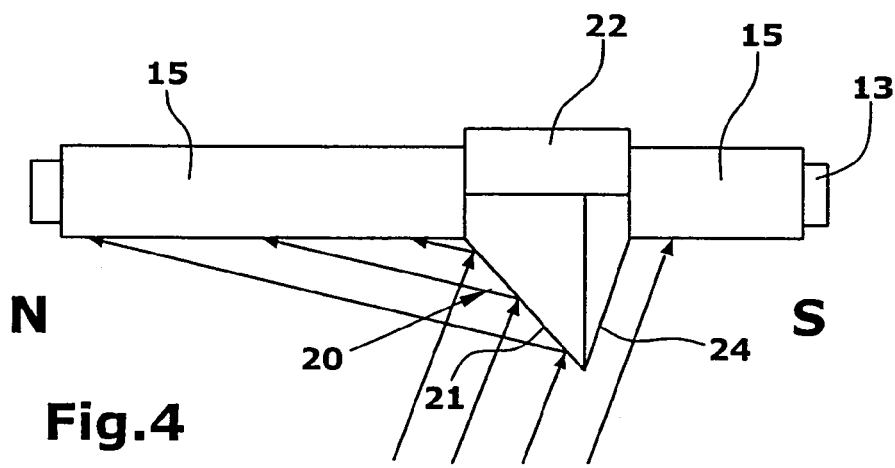

FIG. 4 shows the reflection behavior of a double mirror collar in the morning and in the evening of a summer day. The radiation hits the collector with a small northern sun incident angle so that the concentrated sun radiation coming from the parabolic mirrors is mostly reflected by the northern mirror cone (21) to the active area of the absorber tube. In this case the southern mirror cone (24) does not have an important reflection effect.

Figure 5:
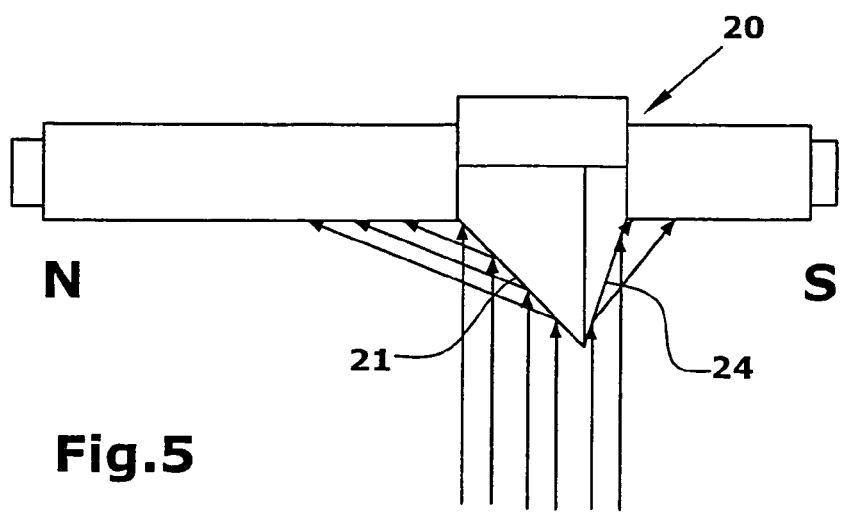

FIG. 5 shows the reflection behavior of a double mirror collar during the day in summer. In summer the sun incident angle is almost vertical or very small during the whole day. Both mirror cones, mirror cone (21) and (24) are reflecting the sun radiation to the active area of the absorber tube.

Figure 6:
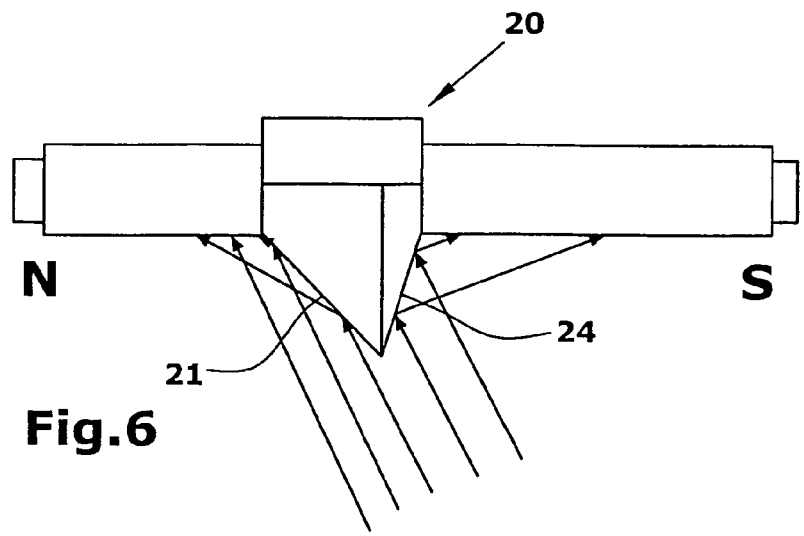

FIG. 6 shows the reflection behavior of a double mirror collar in spring and autumn. The radiation comes with a small southern sun incident angle and is reflected to the absorber tube by both mirror cones, mirror cone (21) and (24).

Figure 7:
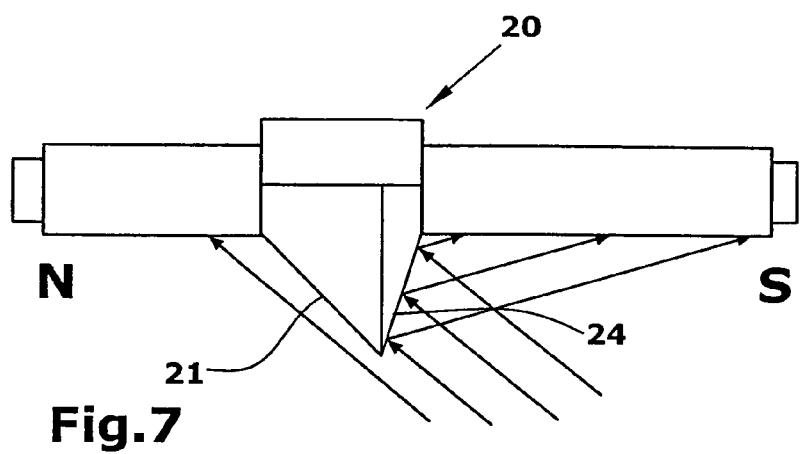

FIG. 7 shows the reflection behavior of a double mirror collar in winter. The radiation comes with a large southern sun incident angle and is reflected to the absorber tube by only the southern mirror cone (24).

Figure 8:
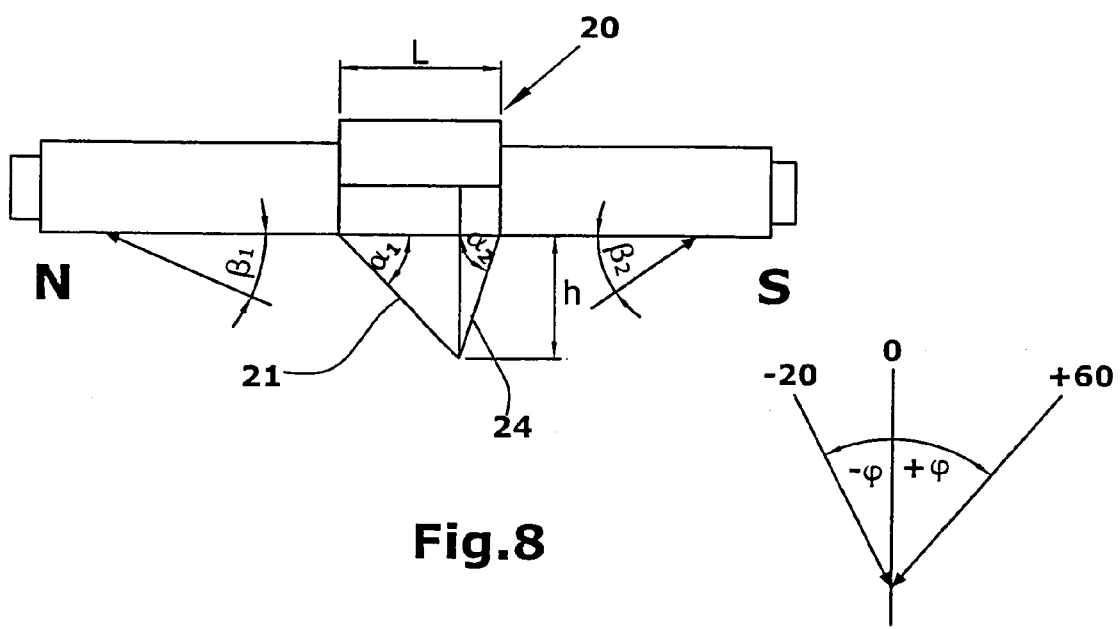
FIG. 8 a drawing to indicate distance an angle names

FIG. 8 shows the cone angles of the northern and southern mirror cone and several important physical data.

The meanings are:

$\alpha 1$=northern mirror cone angle
$\alpha 2$=southern mirror cone angle
$\sigma$ =sun incident angle
$\beta 1$=northern absorber tube hit angle
$\beta 2$=southern absorber tube hit angle
h=mirror collar high
L=mirror collar length Therefore, the following equations are valid:

$$\beta 1 = 2*\alpha 1 - 90° + \sigma (-20° < \sigma < 90° - \alpha 1) \quad (1)$$

$$\beta2=2*\alpha2-90°+\sigma(\alpha2-90°<\sigma<+60°) \quad (2)$$

$$h = \frac{L}{\frac{1}{\tan(\alpha 1)} + \frac{1}{\tan(\alpha 2)}} \quad (3)$$

For a collector location in the south of the USA the sun radiation is irradiated manly with sun incident angles between ($\sigma=-20°$ and $\sigma=+60°$. In this interval about 97% of the total irradiated solar energy is irradiated onto the collector. If we consider a absorber tube hit angle of 10° as sufficient for extremes sun incident angles, so we get due to the optical relation in the equations (1) and (2) a northern mirror cone angle of $\alpha1=60°$ and a southern mirror cone angle of $\alpha2=80°$. In a north-south orientated parabolic trough collector plant the main part of the solar radiation is irradiated with sun incident angles between $\sigma=+10°$ and $\sigma=+20°$. In this interval relatively large absorber tube hit angles of 50° to 60° are achieved. For large absorber tube hit angles the distance between secondary reflector and absorber tube is shorter and the hit behavior better.

What I claim as my invention is:

1. A parabolic trough collector comprising
   individual absorber tubes (13) connected end-to-end and aligned coaxially with each other so that a heat transfer fluid is able to flow through said individual absorber tubes (13);
   glass tubes (15) enclosing the individual absorber tubes (13) so that the individual absorber tubes (13) connected with each other extend through the glass tubes (15);
   flexible unions (17) for compensating differing length changes of the individual absorber tubes and the glass tubes due to thermal expansion, said flexible unions (17) connecting opposite ends of each of the glass tubes to the individual absorber tubes (13) so that a space is formed between each of the glass tubes and the absorber tubes; and
   conical collars (20; 21, 24) arranged on the glass tubes to partially or fully cover said flexible unions (17), said conical collars having outer sides facing away from the glass tubes;
   wherein said conical collars (20; 21,24) have mirror surfaces on said outer sides arranged to reflect radiation directed toward said flexible unions (17) so that said radiation reflected by the mirror surfaces passes through the glass tubes (15) and then onto the absorber tubes (13).

2. The parabolic trough collector as defined in claim 1, wherein said individual absorber tubes (13) are made of steel and are connected to each other at welding areas (16) between said individual absorber tubes (13).

3. The parabolic trough collector as defined in claim 1, further comprising a reflector support (12) and a parabolic reflector (11) having a focus line and wherein said parabolic reflector (11) is mounted on said reflector support (12) in a fixed relationship with said reflector support (12).

4. The parabolic trough collector as defined in claim 3, further comprising a plurality of metal supports (14) connecting said parabolic reflector to said individual absorber tubes so as to hold said individual absorber tubes at the focus line of the parabolic reflector (11).

5. The parabolic trough collector as defined in claim 1, wherein said flexible unions (17) are at least partially covered by said conical collars (20), each of said conical collars (20) has a wider diameter at one cone end (20a), a smaller diameter at another cone end (20b), said smaller diameter being is equal to an outer diameter of the glass tubes, and a reflective outer surface extending between said one cone end (20a) and said another cone end (20b), said reflective outer surface facing away from said glass tubes.

6. The parabolic trough collector as defined in claim 1, wherein respective pairs of said conical collars (21,24) are arranged to only partially enclose or cover corresponding pairs of said flexible unions (17) at adjacent ends of neighboring ones of said glass tubes, and further comprising respective shields (22) arranged to enclose or cover portions of said corresponding pairs of said flexible unions (17) that are not covered by said respective pairs of said conical collars (21 ,24) so that said corresponding pairs of said flexible unions (17) are completely enclosed and covered by said respective shields and said respective pairs of said conical collars (21,24).

7. The parabolic trough collector as defined in claim 6, wherein each of said pairs of conical collars (21, 24) comprises a first conical collar (21) and a second conical collar (24), and wherein said first conical collar (21) and second conical collar (24) each has a wider diameter at one cone end and a smaller diameter at another cone end, said smaller diameter being equal to an outer diameter of the glass tubes, and wherein said wider diameter of said first conical collar and said wider diameter of said second conical collar are equal, and said one cone end of said first conical collar with said wider diameter is connected to said one cone end of said second conical collar with said wider diameter so that said mirror surfaces of said first conical collar and said second conical collar face in opposite directions from each other and away from the glass tubes.

8. The parabolic trough collector as defined in claim 6, wherein said first conical collar (21) has a cone angle ($\alpha_1$) of 60° and said second conical collar (24) has a cone angle ($\alpha_2$) of 80°.

* * * * *